(12) United States Patent
Schmidt et al.

(10) Patent No.: US 8,142,897 B2
(45) Date of Patent: Mar. 27, 2012

(54) PAINT ADHESION BY POLYVINYL AMINES IN ACIDIC AQUEOUS CORROSION PROTECTION PRODUCT CONTAINING POLYMERS

(75) Inventors: Andreas Schmidt, Nordheim (DE); Ard De Zeeuw, Duesseldorf (DE)

(73) Assignee: Henkel KGaA, Duesseldorf (DE)

( * ) Notice: Subject to any disclaimer, the term of this patent is extended or adjusted under 35 U.S.C. 154(b) by 0 days.

(21) Appl. No.: 13/095,473

(22) Filed: Apr. 27, 2011

(65) Prior Publication Data

US 2011/0281120 A1 Nov. 17, 2011

Related U.S. Application Data

(63) Continuation of application No. PCT/EP2009/061567, filed on Sep. 7, 2009.

(51) Int. Cl.
*B32B 15/09* (2006.01)
*C32F 11/00* (2006.01)
*B05D 3/00* (2006.01)

(52) U.S. Cl. .................. 428/458; 252/389.1; 427/388.2

(58) Field of Classification Search .................. 428/458; 252/389.1; 427/388.2
See application file for complete search history.

(56) References Cited

U.S. PATENT DOCUMENTS 6,566,426 B1 * 5/2003 Kanaida et al. ................. 524/96

FOREIGN PATENT DOCUMENTS

| DE | 102006 039633 | 3/2008 |
|---|---|---|
| EP | 0672467 | 3/1995 |
| EP | 1433876 | 6/2004 |
| EP | 1997934 | 9/2007 |
| WO | WO2007100017 | 9/2007 |
| WO | WO2008022819 | 2/2008 |
| WO | WO2010/049198 | 5/2010 |

OTHER PUBLICATIONS

International Search Report (Translated) for PCT/EP2009/061567, dated Dec. 4, 2009, 3 pages.

\* cited by examiner

*Primary Examiner* — Thao T. Tran
(74) *Attorney, Agent, or Firm* — Mary K. Cameron

(57) ABSTRACT

The invention relates to an aqueous, chromium-free and curable corrosion protection agent for the first coating of metal surfaces, said agent containing at least one organic polymer or copolymer of at least partially acylated vinyl amines, for improving the properties of adhesion of the cured first coating to the metallic surface and to further organic coatings. The invention also relates to a method for producing a first coating comprising the agent according to the invention, and for applying further organic coatings, in particular those based on polyurethane resins and/or based on isocyanates and diols or polyols, and to a metal strip produced in this way or a metal sheet cut off same, which can optionally be shaped.

13 Claims, No Drawings

US 8,142,897 B2

PAINT ADHESION BY POLYVINYL AMINES IN ACIDIC AQUEOUS CORROSION PROTECTION PRODUCT CONTAINING POLYMERS

CROSS-REFERENCE TO RELATED APPLICATIONS

This application is a continuation under 35 U.S.C. Section 365(c) and 120 of International Application No. PCT/EP2009/061567, filed Sep. 7, 2009 and published on May 6, 2010 as WO 2010/049198, which claims priority from German Patent Application No. 10 2008 053 517.6 filed Oct. 28, 2008, which are incorporated herein by reference in their entirety.

FIELD OF THE INVENTION

The present invention relates to an aqueous, chromium-free and curable corrosion protection agent for the first coating of metal surfaces, said agent containing at least one organic polymer or copolymer of at least partially acylated vinyl amines, for improving the properties of adhesion of the cured first coating to the metal surface and to further organic coatings. The invention also relates to a method for producing a first coating comprising the agent according to the invention, and for applying further organic coatings, in particular those based on polyurethane resins and/or based on isocyanates and dials or polyols, and to a metal strip produced in this way or a metal sheet cut off same, which can optionally be shaped.

BACKGROUND OF THE INVENTION

A number of curable, chromium-free first coating agents which are suitable for forming a corrosion protection coating a few micrometers thick on metallic surfaces are known from the prior art. Such first coating agents are conventionally acidic aqueous solutions which bring about an inorganic conversion of the metal surface and a coverage with an organic binder, which is cured after being brought into contact with the first coating agent. In such a method thin inorganic/organic hybrid coatings are obtained which already offer considerable protection against corrosion.

Thus the German laid-open patent application DE 10 2006 039 633 discloses an aqueous curable corrosion protection agent for the first coating of metallic substrates, having a pH in the range from 1 to 3 and containing water and
a) fluoro complex ions of titanium and/or zirconium,
b) at least one corrosion protection pigment,
c) at least one organic polymer which is water-soluble or water-dispersible in the specified pH range and which as such in aqueous solution in a concentration of 50 wt. % has a pH in the range from 1 to 3.

According to the disclosure of DE 10 2006 039 633, in the cured state on metal strip such a corrosion protection agent can already be used as a fully adequate corrosion protection coating. Nevertheless, for an optimal barrier effect against corrosive media and also for the provision of desired mechanical and optical properties of the coated metal strip, a further coating with a curable organic binder system, i.e. the application of further paint systems, is also necessary. An optional second coating is also mentioned in DE 10 2006 039 633, although the properties of adhesion to conventional top coats are not ideal, such that the second coating can easily be penetrated beneath and its functionality compromised.

EP 0 672 467 discloses an intermediate rinsing with a solution of acylated polyvinyl amines for phosphated metal surfaces prior to electrodeposition painting, in order to improve adhesion of the dipping paint to the phosphated metal surface. The use of acylated polyvinyl amines in chromium-free aqueous corrosion protection agents containing an organic binder for the first coating is not mentioned here, nor is the suitability of acylated polyvinyl amines as adhesion promoters for specific organic binder systems.

SUMMARY OF THE INVENTION

An object of the present invention is therefore to improve the adhesion of organic top coat systems to metallic surfaces, in particular to zinc and zinc alloy surfaces, by means of curable corrosion-protective but chromium-free first coating agents containing an organic binder and to establish an adequate adhesion to paint systems, in particular to paint systems based on polyurethane resins.

The term "first coating" means here that the metallic substrate did not undergo any other corrosion protection treatment prior to contact with the corrosion protection agent according to the invention. The corrosion protection agent according to the invention should rather be applied to a freshly produced or freshly cleaned metal surface. This treatment represents the first corrosion protection measure for the metallic substrate. It is entirely desirable here for further decorative and/or corrosion-protective coatings, such as for example conventional dipping paints, spraying paints or powder coatings, to be applied to the metallic substrate following application of the corrosion protection agent according to the invention.

One aspect of the invention is a chromium-free, curable corrosion protection agent for the first coating of metallic substrates, which has a pH in the range from 1 to 3 and contains water and components:
a) fluoro complex ions of titanium and/or zirconium,
b) at least one corrosion protection pigment,
c) at least one organic polymer or copolymer which is water-soluble or water-dispersible in the specified pH range and which as such in aqueous solution in a concentration of 50 wt. % has a pH in a range from 1 to 3, and
d) at least one polyvinyl amine comprising amino groups and having a molecular weight of greater than 100,000 g/mol but not greater than 1,000,000 g/mol, having a degree of acylation of not less than 80%.

Another aspect of the relates to a method for producing a first coating comprising the agent according to the invention, and for applying further organic coatings, in particular those based on polyurethane resins and/or based on isocyanates and diols or polyols. Another aspect of the invention is a metal strip produced in this way or a metal sheet cut off same, which can optionally be shaped.

DETAILED DESCRIPTION OF THE INVENTION

Surprisingly the object underlying the invention is achieved by a chromium-free, curable corrosion protection agent for the first coating of metallic substrates, which has a pH in the range from 1 to 3 and contains water and
a) fluoro complex ions of titanium and/or zirconium,
b) at least one corrosion protection pigment,
c) at least one organic polymer which is water-soluble or water-dispersible in the specified pH range and which as such in aqueous solution in a concentration of 50 wt. % has a pH in the range from 1 to 3, wherein the agent additionally contains d) at least one water-soluble or water-dispersible organic polymer or copolymer of vinyl amines which is not an organic polymer or copolymer corresponding to component c) and which has at least one unit of the general structural formula (I):

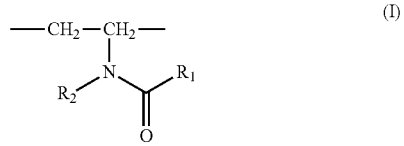

the residues $R_1$ and $R_2$ being selected independently of each other from hydrogen and/or an alkyl group having no more than 6 carbon atoms.

Surprisingly both the adhesion of the cured first coating agent to the metallic substrate and the adhesion of an organic top coat to the cured first coating are increased markedly with the presence of a water-soluble or water-dispersible organic polymer or copolymer of vinyl amines according to component d) in an acidic first coating agent known in the prior art containing components a) to c).

Vinyl amines are understood according to the invention to be all vinyl amines substituted at the nitrogen atom as well as unsubstituted vinyl amine itself.

It has been found that the presence in particular of formylated and acetylated amino groups in the organic polymer or copolymer corresponding to the general structural formula (I) has a positive influence on the adhesion of the cured first coating to the substrate. Accordingly such first coating agents according to the invention are preferred which contain at least one organic polymer or copolymer according to component d) having at least one unit of the general structural formula (I), in which the residue $R_1$ is selected from hydrogen or a methyl group and the residue $R_2$ is a hydrogen atom, all units of the general structural formula (I) particularly preferably being substituted in this way.

In addition to the units of the general structural formula (I), the organic polymer or copolymer of vinyl amines of component d) can contain any other structural units, for example units of vinyl alcohol and esterification products thereof and of iminoethylene. In view of their easier accessibility and greater efficiency for increasing paint adhesion, however, polyvinyl amines whose amino groups are at least partially acylated and preferably formylated are preferred as component d).

It has further been found that as the number of units according to the general structural formula (I) in the organic polymer or copolymer of component d) increases, the paint adhesion of the cured first coating agent to the metallic substrate improves steadily. Consequently polyvinyl amines having a degree of acylation of not less than 50%, preferably not less than 80% and in particular not less than 90% are preferred as the organic polymer of component d).

Furthermore, it has been found according to the invention that if polyvinyl amines whose amino groups are at least partially acylated are used as component d) in a first coating agent according to the invention, optimal results in terms of paint adhesion are obtained if their molecular weight is preferably greater than 10,000, particularly preferably greater than 100,000, but preferably not greater than 1,000,000 g/mol, particularly preferably not greater than 500,000 g/mol.

Accordingly a formylated polyvinyl amine having a molecular weight of greater than 100,000 g/mol but not greater than 500,000 g/mol and a degree of acylation of not less than 90% is most suitable and therefore preferred in particular for the object underlying the invention.

Specific embodiments of components a) to c) of the curable corrosion protection agents according to the invention are provided and described in further detail below.

The fluoro complex ions of titanium and/or zirconium according to component a) of the agent according to the invention are preferably hexafluoro complex ions. These can be introduced in the form of the free acids or in the form of salts thereof which are soluble in the corrosion protection agent. In order to establish the acidic pH it is favorable to introduce the fluoro complex ions as hexafluoric acids. The fluoro complex ions can also contain on average fewer than 6 fluorine atoms per complex molecule. This can be achieved for example by using, in addition to hexafluoro complex ions, further compounds or salts with titanium and/or zirconium ions which are capable of forming fluoro complexes. Oxide carbonates or hydroxy carbonates can be cited by way of example. On the other hand, over and above the presence of hexafluoro complex ions, the corrosion protection agent can have an excess of free fluoride ions, which can be incorporated in the form of hydrofluoric acid for example.

The corrosion protection pigment b) is preferably a particulate organic or inorganic compound which inhibits the diffusion of water and/or other corrosive agents through the coating by means of diffusion inhibition ("barrier pigment") or which can release molecules or ions having an anticorrosive action. A compound having cation-exchanger properties is preferably used as the corrosion protection pigment. A compound containing cations of divalent or polyvalent metals which can be exchanged with alkali metal ions is particularly preferred. Preferred exchangeable cations are the cations of Ca, Ce, Zn, Sr, La, Y, Al and Mg. Corrosion protection pigments based on silicates having a layered or spatial network structure and containing such exchangeable cations are preferred in particular. The corrosion protection pigment can for example be a synthetic amorphous silica which is at least partially present in the form of its salt with exchangeable calcium ions. In order to correspond to the desired film thickness of the cured corrosion protection agent specified below, the average particle size of the corrosion protection pigment (D50 value, which can be determined by light scattering methods for example) is in the range from 0.5 to 10 μm, in particular in the range from 1 to 4 μm.

The organic polymer to be selected as component c) has the intrinsic property of having a pH in the range from 1 to 3, preferably in the range from 1.5 to 2.5 and in particular in the range from 1.8 to 2.2, in aqueous solution at a concentration of approximately 50 wt. %. To this end it is necessary for the polymer in aqueous solution to carry acid-reacting groups which give the polymer solution a pH in the cited range without the need to establish this pH by the addition of a further acid.

The presence of component c) makes the corrosion protection agent "curable", in other words ensures that the corrosion protection agent solidifies on the metal surface. This solidification can take place purely physically through the evaporation of water and/or solvent (which process can be described as "film formation"). Curing is however preferably based at least partially on a chemical reaction ("crosslinking"), during which the molar mass of the polymer or copolymer c) increases. Examples of such reactions are polymerization reactions, for example by means of C=C double bonds, or condensation reactions. These reactions can be initiated thermally or by the influence of high-energy radiation (e.g. electron radiation, gamma radiation, UV or light radiation). In the context of the present invention a polymer or copolymer which can be cured thermally and/or by evaporation of water and/or solvent is preferably used. The application of heat can come from a heat carrier (such as the preheated substrate or hot air, for example) or from infrared radiation.

The organic polymer or copolymer c) contains ethylenically unsaturated monomers which are radically polymerizable by simple means.

The following ethylenically unsaturated monomers can be used for example: vinyl-aromatic monomers, such as styrene and [alpha]-methylstyrene, esters of [alpha],[beta]-monoethylenically unsaturated mono- and dicarboxylic acids having preferably 3 to 6 C atoms, such as in particular acrylic acid, methacrylic acid, maleic acid, fumaric acid and itaconic acid, with alkanols having in general 1 to 12, preferably 1 to 8 C atoms, such as in particular methyl, ethyl, n-butyl, isobutyl, pentyl, hexyl, heptyl, octyl, nonyl, decyl and 2-ethylhexyl acrylate and methacrylate, dimethyl or di-n-butyl fumarate and maleate.

Furthermore, monomers having multiple ethylenically unsaturated double bonds can also be used. Examples are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate as well as divinyl benzene, vinyl methacrylate, vinyl acrylate, allyl methacrylate, allyl acrylate, diallyl maleate, diallyl fumarate, methylene bisacrylamide, cyclopentadienyl acrylate, triallyl cyanurate or triallyl isocyanurate.

The organic polymer or copolymer c) preferably contains at least one monomer selected from acrylic acid, methacrylic acid, acrylic acid esters and methacrylic acid esters and preferably has at least one type of functional group selected from epoxide, silane, hydroxyl, carboxyl, phosphoric acid and phosphoric acid ester groups.

It is particularly preferably synthesized in such a way that it contains at least two monomers selected from acrylic acid, methacrylic acid, acrylic acid esters and methacrylic acid esters, wherein at least one monomer selected from acrylic acid esters and methacrylic acid esters is incorporated and wherein the polymer has at least one type of functional group selected from epoxide, silane, hydroxyl, carboxyl, phosphoric acid and phosphoric acid ester groups.

Polymers or copolymers carrying phosphoric acid or phosphoric acid ester groups are preferred, wherein the proportion of monomers carrying phosphoric acid or phosphoric acid ester groups in the polymer is in particular in the range from 0.5 to 4, particularly preferably in the range from 1 to 2 mol %.

In addition to the phosphoric acid or phosphoric acid ester groups, at least one further group selected from epoxide groups, silane groups, carboxyl groups and hydroxyl groups is preferably present in the polymer or copolymer. The content of hydroxyl groups in the polymer or copolymer can be 0.5 to 3.5 mg per g of polymer. A particularly preferred polymer contains phosphoric acid or phosphoric acid ester groups, carboxyl groups and hydroxyl groups.

It is further preferable for the polymer or copolymer additionally to contain, in addition to hydroxyl, carboxyl, phosphoric acid or phosphoric acid ester groups, carboxylic acid amide groups, wherein at least one hydroxyalkyl residue, preferably at least one hydroxymethyl residue, is bonded to the N atom of the carboxylic acid amide group. Polymers are preferred in particular which contain phosphoric acid or phosphoric acid ester groups and additionally both hydroxyl groups and carboxyl groups as well as the cited carboxylic acid amide groups.

Examples of such monomers are methacrylic acid and acrylic acid C1-C8 hydroxyalkyl esters such as n-hydroxyethyl, n-hydroxypropyl or n-hydroxybutyl acrylate and methacrylate as well as compounds such as N-methylol acrylamide, glycidyl methacrylate and phosphoric acid esters of hydroxyacrylates and hydroxymethacrylates.

An addition of organic compounds f) capable of forming chelate complexes is recommended above all if the polymer c) has no silane groups.

The corrosion protection agent preferably contains phosphate ions as a further component e). These can be incorporated in the form of phosphoric acid and/or in the form of salts thereof. If phosphoric acid is used it can be necessary to adjust the pH of the corrosion protection agent to the desired range through the addition of basic substances. It is possible to use oxides or carbonates of the metals listed below as basic substances, provided that the presence of the corresponding metal ions is desired. Regardless of the form in which the phosphate ions are incorporated, the corresponding equilibrium between the differently protolyzed phosphate ion species will be established in the treatment agent according to its pH. For the quantitative information given below regarding the preferred composition it is assumed for the sake of simplicity that the phosphate ions are in the form of phosphoric acid.

The corrosion protection agent according to the invention can furthermore contain manganese and/or magnesium ions as an additional component f). The presence of manganese ions is preferred. In this case magnesium ions can be present in addition to the manganese ions, and this is even preferred. These metal ions are preferably incorporated into the corrosion protection agent as phosphates by reacting oxides, hydroxides or carbonates of these metals with phosphoric acid. These oxides, hydroxides or carbonates can therefore serve as basic components in order to adjust the pH to the desired range if phosphoric acid is present.

Furthermore the corrosion protection agent according to the invention preferably additionally contains as component g) at least one organic compound capable of forming chelate complexes. Organic compounds (molecules or ions) which are capable of forming chelate complexes are for example aminoalkyls, in particular aminomethylene phosphonic acids, phosphonocarboxylic acids, geminal diphosphonic acids and phosphoric acid esters as well as salts thereof. Selected examples are phosphonobutane tricarboxylic acid, aminotris(methylene phosphonic acid), diethylenetriamine penta(methylene phosphonic acid), (2-hydroxyethyl)aminobis(methylene phosphonic acid), ethylenediamine tetrakis (methylene phosphonic acid), hexamethylenediamine tetrakis(methylene phosphonic acid), (2-ethylhexyl)aminobis (methylene phosphonic acid), n-octylaminobis(methylene phosphonic acid), cyclohexane-1,2-diamine tetrakis(methylene phosphonic acid), pentaethylene hexamine octakis(methylene phosphonic acid), N,N-bis(3-aminopropyl)aminohexakis(methylene phosphonic acid).

Further specific examples are cited in paragraph [0014] of the laid-open patent application DE 10 2006 039 633.

It is further preferable for the corrosion protection agent additionally to contain molybdate and/or tungsten ions as component h). These are preferably used as ammonium or alkali salts.

It is further preferable for the corrosion protection agent additionally to contain at least one cation selected from zinc, cobalt, nickel, vanadium and iron ions as component i). Ions dissolved in the corrosion protection agent are meant here and not ions which are bonded in the corrosion protection pigment b) as exchangeable cations. Like the manganese and/or magnesium ions cited above, these cations too are preferably incorporated as phosphates. Once again this can be done by reacting oxides, hydroxides or carbonates of these ions with phosphoric acid. The corrosion protection agent preferably contains zinc ions in particular.

It is further preferable for the corrosion protection agent to contain as an additional component j) at least one reducing agent selected from iron(II) ions and hydroxylamine, hydroxylammonium salts or hydroxylamine-cleaving compounds. This applies in particular if the corrosion protection agent contains manganese(II) ions.

According to the definition the corrosion protection agent contains at least components a), b), c) and d). Each of the further optional components e) to j) improves certain properties in the range of properties of the corrosion protection agent according to the invention. It is therefore particularly preferable for the corrosion protection agent to contain at least one, preferably at least 2 and in particular at least 3 of the optional components e) to j). For example, it is particularly preferable for the corrosion protection agent to contain both phosphate ions and manganese and/or magnesium ions. It is further preferable for the corrosion protection agents simultaneously to contain phosphate ions and at least one organic compound capable of forming chelate complexes. In a further preferred embodiment the corrosion protection agent contains manganese and/or magnesium ions and additionally at least one cation selected from zinc, cobalt, nickel, vanadium and iron ions. If manganese(II) ions are present, the corrosion protection agent preferably additionally contains a reducing agent i).

In a further preferred embodiment the corrosion protection agent contains at least one of components e), f), g) and i) together with molybdate and/or tungsten ions.

A particularly preferred corrosion protection agent contains at least one representative from each of components e), f), g), h) and i).

The corrosion protection agent can additionally contain additives having a dispersing action, such as are known for example for the grinding of pigment pastes for paint production.

In the ready-to-use state the corrosion protection agent preferably contains the components in the following proportions in wt. % relative to the entire corrosion protection agent:
water: 25 to 69.6 wt. %,
a) fluoro complex ions of titanium and/or zirconium, calculated as hexafluorotitanic or hexafluorozirconic acid: in total 0.3 to 3 wt. %, preferably 0.5 to 2 wt. %,
b) corrosion protection pigment(s): in total 5 to 25 wt. %, preferably in total 10 to 20 wt. %,
c) organic polymer which is water-soluble or water-dispersible in the specified pH range and which as such in aqueous solution in a content of 50 wt. % has a pH in the range from 1 to 3: 25 to 50 wt. %, preferably 30 to 40 wt. %,
d) acylated polyvinyl amines: in total 0.1 to 5 wt. %, preferably 0.5 to 2 wt. %,
e) phosphate ions, calculated as phosphoric acid: 0 to 5 wt. %, preferably 0.5 to 4 wt. %,
f) manganese and/or magnesium ions: in total 0 to 2 wt. %, preferably 0.1 to 1 wt. %,
g) organic compound(s) capable of forming chelate complexes: in total 0 to 5 wt. %, preferably 0.5 to 3 wt. %,
h) molybdate and/or tungsten ions, calculated as ammonium salt: in total 0 to 1 wt. %, preferably 0.05 to 0.5 wt. %,
i) cations selected from zinc, cobalt, nickel, vanadium and iron ions: in total 0 to 1 wt. %, preferably 0.1 to 0.5 wt. %,
j) reducing agents selected from iron(II) ions and hydroxylamine, hydroxyl ammonium salts or hydroxylamine-cleaving compounds: in total 0 to 0.1 wt. %, preferably 0.005 to 0.05 wt. %.

In addition to these components further active substances or auxiliary substances can be present, for example the aforementioned additional polymers and/or additives having a dispersing action. The proportions of the individual components should of course be chosen such that they add to 100%. This also applies if further components are present in addition to the cited components a) to j). In a preferred embodiment the corrosion protection agent contains exclusively water along with components a) to d) and one or more of components e) to j), supplemented by the aforementioned additional polymers and additives if need be. It should be noted here that counterions corresponding to the specified ionic components must be present. For example, the molybdate and/or tungsten ions are preferably used as ammonium or alkali metal salts. Overall, however, it is preferable for the corrosion protection agent to contain no further anions other than the fluoro complexes a) present as anions, the anionic groups in the corrosion protection pigment b) and in the polymers or copolymers c) and d), the phosphate ions e) and optionally the anions of the organic compounds g) capable of forming chelate complexes. This condition ensures that after application and curing of the corrosion protection agent no salts remain in the coating which are readily soluble in water and weaken the corrosion protection action.

In particular the corrosion protection agent according to the invention should contain the smallest possible amount of organic compounds such as organic solvents, which are volatile under stoving conditions and are released into the ambient air as volatile organic carbon (VOC). Accordingly it is preferable for the corrosion protection agent to contain no more than 5 wt. %, preferably no more than 2 wt. % and in particular no more than 0.5 wt. % of organic compounds which under atmospheric pressure have a boiling point of less than 150° C. to a maximum of 150° C.

For reasons of broad applicability, production speed and energy consumption, it is desirable to cure the metallic substrate with the applied corrosion protection agent at a temperature of no more than 150° C. The organic polymer or copolymer c) thus preferably has the property of being curable at a temperature of no more than 150° C., preferably no more than 100° C., within no more than 60 seconds, preferably no more than 30 seconds. The cited temperatures are the substrate temperatures of the metal substrate with the applied corrosion protection agent.

In a further aspect the present invention therefore also relates to a method for coating metal strip with a curable corrosion protection agent according to the invention, preferably in a wet film thickness on a moving metal strip such that a layer with a thickness in the range from 0.5 to 10 μm, preferably 1 to 5 μm, is obtained on curing by heating the metal strip. A strip temperature of a maximum of 150° C., preferably a maximum of 100° C., for a period of a maximum of 60 seconds, preferably a maximum of 30 seconds, is preferred to this end.

Curing of the corrosion protection agent according to the invention on the metallic substrate results in itself in a readily adhering and corrosion-protective top coat which is suitable in particular for further coating with organic paint systems based on the superficially bonded polymers or copolymers of vinyl amines according to component d) of the agent according to the invention, in particular for paint systems based on polyurethane resins and/or based on isocyanates and diols or polyols.

The method according to the invention thus encompasses in particular also the application of a further coating agent containing an organic binder system based on polyurethane resins and/or based on isocyanates and diols or polyols on a cured corrosion protection agent according to the invention and curing of the coating agent. The application of further largely organic top coats serves initially to provide an increased corrosion protection of the metallic substrate based on the increased barrier effect against aggressive compounds and media. In addition, top coats provide improved abrasion resistance and through the addition of pigments also serve decorative purposes, such as for instance an optical covering of the metallic substrate surface or a color-imparting paint finish. The precondition for a lasting stability of the overall coating built up from various coating agents is a good adhesion of the cured coating agents to one another and to the boundary surface to the metallic substrate. In the method according to the invention these properties and the compatibility of the organic top coats and binder systems with one another are satisfied, wherein binder systems based on polyurethane resins and/or based on isocyanates and dials or polyols as already mentioned are preferred as the second coating on the cured corrosion protection agent according to the invention.

The method according to the invention for coating metallic surfaces can preferably be used on metal strips selected from strips of zinc or zinc alloys, iron or iron alloys, aluminum or aluminum alloys, and from steel strips coated with zinc or zinc alloys or with aluminum or aluminum alloys. The first coating of strips selected from zinc or zinc alloys and from steel strips coated with zinc or zinc alloys is preferred in particular, because of the slightly better adhesion to the metallic substrate.

The present invention additionally encompasses a metal strip produced in a method according to the invention or a metal sheet cut off same, which can optionally be shaped. Such a metal strip is preferred which in addition to the cured coating with an agent according to the invention has a cured second coating with a coating agent containing a binder system based on polyurethane resins and/or based on isocyanates and diols or polyols.

EMBODIMENT EXAMPLES

Curable corrosion protection agents according to the invention are listed below by way of example, and their use is described in methods according to the invention which provide for a second coating with a coating agent containing a binder system based on polyurethane resins or based on isocyanates and diols or polyols. The efficiency of the coating systems with regard to their adhesion properties is demonstrated in a boiling test and comparable coating systems from the prior art are compared.

TABLE 1

Aqueous base composition of all example formulations

| Component* | Name | Amount/wt. %# |
|---|---|---|
| — | $H_3PO_4$ | 2.7 |
| a) | $H_2TiF_6$ | 1.0 |
| b1) | ZnO | 0.5 |
| b2) | Calcium-modified silica | 15.9 |
| c) | Acrylate resin | 35.0 |
| g) | Hydroxyethane-1,1-diphosphonic acid | 0.5 |

*according to nomenclature of components in the description
The difference between the sum of percentages by weight of the components and 100 wt. % is made up by water Table 1 shows a base composition modeled on the aqueous corrosion protection agent disclosed in DE 10 2006 039 633. Agents according to the invention are prepared from this base composition by the addition of corresponding amounts of partially formylated polyvinyl amines.

TABLE 2

Example formulations for the first coating and results for paint adhesion following application of a second coating based on a polyurethane resin

| Example | Addition*/$M_r$ in g mol$^{-1}$ | Boiling test# 6 mm | 8 mm |
|---|---|---|---|
| C1 | — | 3 | 3 |
| C2 | Polyethylenimine/800 | 2 | 3 |
| C3 | Polyvinyl alcohol, approx. 10,000 Degree of acetylation 13% | 2 | 2 |
| E1 | Poly(N-formyl vinyl amine)/340,000 Degree of formylation 100% | 0 | 1 |
| E2 | Poly(N-formyl vinyl amine)/10,000 Degree of formylation 100% | 2 | 3 |
| E3 | Poly(N-formyl vinyl amine)/340,000 Degree of formylation 90% | 0 | 0 |
| E4 | Poly(N-formyl vinyl amine)/340,000 Degree of formylation 70% | 1 | 2 |
| E5 | Poly(N-formyl vinyl amine)/340,000 Degree of formylation <10% | 2 | 3 |
| E6 | Poly(N-formyl vinyl amine)/10,000 Degree of formylation <10% | 2 | 3 |

*Proportion of the polymeric addition in the example formulation is 5 wt. % of the overall composition of the corrosion protection agent based on the base composition of Table 1
Immersion of the sample sheet for 1 h in boiling demineralized water and assessment of delamination on cross-hatching by means of Erichsen indentation (6 and 8 mm respectively) on a scale from 0 to 3
0: no delamination
1: negligible delamination
2: pronounced delamination
3: complete delamination Table 2 contains an overview of the compositions according to Table 1 containing a 5 wt. % proportion of various polymeric additives, tested with regard to paint adhesion.

Galvanized steel sheets (HDG, hot-dip galvanized) were first degreased with an alkaline cleaner (Ridoline® 1340, Henkel AG & Co. KGaA), then rinsed with demineralized water ($\kappa<1$ μScm$^{-1}$), and then the corrosion protection agent from Table 1 containing the various polymeric additives according to Table 2 was applied with a knife in a defined wet film thickness of 5 μm and dried for 5 minutes at a temperature of 70° C. Once the corrosion protection agent had dried, a paint system based on polyurethane (PE Outdoor Beckry-Pol, Becker Industrielack GmbH) was applied in a wet film thickness of approx. 30 μm to the metal strip coated with the first coating and cured at a strip temperature of 232° C.

It was found that in the boiling test, corrosion protection agents containing in particular polyvinyl amines having a high molar mass (E1, E3-E5: >10,000 g/mol) as the polymeric additive are outstandingly suitable for improving adhesion to an organic top coat based on a polyurethane resin as compared with the base formulation C1, wherein a likewise high degree of acylation (E3, E4: >70%) is particularly advantageous.

What is claimed is:

1. A chromium-free, curable corrosion protection agent for the first coating of metallic substrates, the corrosion protection agent having a pH in the range of from 1 to 3 and containing water and components:
   a) fluoro complex ions of titanium and/or zirconium,
   b) at least one corrosion protection pigment,
   c) at least one organic polymer or copolymer which is water-soluble or water-dispersible in the specified pH range and which as such in aqueous solution in a concentration of 50 wt. % has a pH in a range from 1 to 3, and
   d) at least one polyvinyl amine comprising amino groups that are acylated, said polyvinyl amine having a molecular weight of greater than 100,000 g/mol but not greater than 1,000,000 g/mol and a degree of acylation of not less than 80%.

2. The agent according to claim 1, wherein the amino groups of the polyvinyl amines of component d) are formylated.

3. The agent according to claim 2, wherein the molecular weight of the polyvinyl amines of component d) is not greater than 500,000 g/mol.

4. The agent according to claim 1, wherein the degree of acylation of the polyvinyl amines of component d) is not less than 90%.

5. The agent according to claim 1, wherein the water-soluble or water-dispersible organic polymers or copolymers of component c) are synthesized from one or more monomers selected from acrylic acid, methacrylic acid, acrylic acid ester and methacrylic acid ester monomers, and comprise at least one type of functional group selected from epoxide, silane, hydroxyl, carboxyl, phosphoric acid and phosphoric acid ester groups.

6. The agent according to claim 5, wherein the water-soluble or water-dispersible organic polymers or copolymers of component c) contain at least one monomer selected from acrylic acid esters and methacrylic acid esters.

7. The agent according to claim 5, wherein monomers carrying phosphoric acid or phosphoric acid ester groups are present in the polymer or copolymers of component c) in an amount ranging from 0.5 to 4 mol %.

8. The agent according to claim 1, wherein in a ready-to-use state the agent contains said components in quantity ranges, indicated in wt % based on the entire corrosion protection agent, of:
   water: 25 to 69.6 wt. %,
   a) fluoro complex ions of titanium and/or zirconium, calculated as hexafluorotitanic or hexafluorozirconic acid: in total 0.3 to 3 wt. %,
   b) corrosion protection pigment(s): in total 5 to 25 wt. %,
   c) organic polymer which is water-soluble or water-dispersible in the specified pH range and which as such in aqueous solution in a content of 50 wt. % has a pH in the range from 1 to 3: 25 to 50 wt. %,
   d) acylated polyvinyl amines: in total 0.1 to 5 wt. %,
   e) phosphate ions, calculated as phosphoric acid: 0 to 5 wt. %,
   f) manganese and/or magnesium ions: in total 0 to 2 wt. %,
   g) organic compound(s) capable of forming chelate complexes: in total 0 to 5 wt. %,
   h) molybdate and/or tungsten ions, calculated as ammonium salt: in total 0 to 1 wt. %,
   i) cations selected from zinc, cobalt, nickel, vanadium and iron ions: in total 0 to 1 wt. %,
   j) reducing agents selected from iron(II) ions and hydroxylamine, hydroxyl ammonium salts or hydroxylamine-cleaving compounds: in total 0 to 0.1 wt. %.

9. The agent according to claim 1, comprising no more than 5 wt. % of organic compounds which under atmospheric pressure have a boiling point of at most 150° C.

10. A method for coating metal strip, comprising the steps of applying a corrosion protection agent according to claim 1 to a degreased and cleaned metal strip, curing the corrosion protection agent on the metal strip, and obtaining a film having a thickness in a range of from 0.5 to 10 μm.

11. The method according to claim 10, wherein, following curing of the corrosion protection agent, a further coating agent containing an organic binder system based on polyurethane resins and/or based on isocyanates and diols or polyols, is applied and cured.

12. The method according to claim 10, wherein the metal strip is selected from strips of zinc or zinc alloys, iron or iron alloys, aluminum or aluminum alloys, and from steel strips coated with zinc, zinc alloys, aluminum or aluminum alloys.

13. A coated metal strip or a metal sheet cut off said metal strip, optionally shaped, comprising a coating produced in accordance with claim 10.

* * * * *